United States Patent [19]
McMahan et al.

[11] Patent Number: 6,002,240
[45] Date of Patent: Dec. 14, 1999

[54] SELF HEATING OF BATTERIES AT LOW TEMPERATURES

[75] Inventors: Robert L. McMahan, Cedar Park; John A. Cummings, Round Rock, both of Tex.

[73] Assignee: Dell USA, L.P., Round Rock, Tex.

[21] Appl. No.: 08/989,474

[22] Filed: Dec. 12, 1997

[51] Int. Cl.⁶ .............................. H02J 7/00; H01M 10/50
[52] U.S. Cl. .................................. 320/150; 429/7; 429/62
[58] Field of Search ........................... 320/150; 429/7, 429/62

[56] References Cited

U.S. PATENT DOCUMENTS

| | | | |
|---|---|---|---|
| 4,025,861 | 5/1977 | Godard et al. | 320/152 |
| 5,215,834 | 6/1993 | Reher et al. | 429/62 |
| 5,307,000 | 4/1994 | Podrazhansky et al. | 320/129 |
| 5,362,942 | 11/1994 | Vanderslice, Jr. et al. | 219/209 |
| 5,508,126 | 4/1996 | Braun | 429/7 |
| 5,518,832 | 5/1996 | Fernandez et al. | 429/49 |
| 5,541,489 | 7/1996 | Dunstan | 320/2 |
| 5,565,759 | 10/1996 | Dunstan | 320/48 |
| 5,568,039 | 10/1996 | Fernandez | 320/29 |
| 5,583,415 | 12/1996 | Fernandez et al. | 320/15 |
| 5,600,230 | 2/1997 | Dunstan | 320/48 |
| 5,623,196 | 4/1997 | Fernandez et al. | 320/30 |
| 5,627,453 | 5/1997 | Sheehan et al. | 320/30 |
| 5,631,537 | 5/1997 | Armstrong | 320/15 |
| 5,645,949 | 7/1997 | Young | 429/7 |
| 5,652,502 | 7/1997 | van Phuoc et al. | 320/30 |
| 5,710,597 | 1/1998 | Rosenbluth et al. | 307/66 |
| 5,717,313 | 2/1998 | Grabon | 320/150 |
| 5,795,664 | 8/1998 | Kelly | 429/7 |
| 5,796,238 | 8/1998 | Hiratsuka et al. | 320/112 |
| 5,834,131 | 11/1998 | Lutz et al. | 429/7 |
| 5,871,859 | 2/1999 | Praise | 429/7 |

*Primary Examiner*—Peter S. Wong
*Assistant Examiner*—Gregory J. Toatley, Jr.
*Attorney, Agent, or Firm*—Skjerven, Morrill, MacPherson, Franklin & Friel, L.L.P.; Marc R. Ascolese

[57] ABSTRACT

A rechargeable battery pack that includes a controller, a temperature monitoring circuit, a rechargeable battery, and a heating circuit, can sense when the battery pack is exposed to a harmful low temperature and cause the heating circuit to heat the battery pack, particularly the battery pack's controller, so that it remains in a temperature regime compatible with normal operation. The rechargeable battery has a positive terminal and a negative terminal. The heater circuit is coupled to the rechargeable battery and the controller is coupled to the heater circuit. The temperature monitoring circuit is coupled to the controller. The temperature monitoring circuit is capable of measuring a temperature of the battery pack and providing a temperature indication. Based upon the indication, the controller causes the heater circuit to heat the controller.

30 Claims, 2 Drawing Sheets

SELF HEATING OF BATTERIES AT LOW TEMPERATURES

RELATED APPLICATIONS

This application relates to the co-pending U.S. patent application Ser. No. 08/989,605, entitled "Self Discharge of Batteries at High Temperatures," by John A. Cummings, filed the same day as the present application, and incorporated herein by reference.

BACKGROUND OF THE INVENTION

1. Field of the Invention

This invention relates to batteries, particularly rechargeable battery packs that have electronics for protecting the battery packs.

2. Description of the Related Art

Rechargeable batteries are used in a variety of electronic devices, including portable computers, portable computer peripherals, personal digital assistants (PDAs), cellular phones, and cameras. Because of the wide variety of uses for rechargeable batteries, a number of different rechargeable battery chemistries have been developed, each having certain advantages and disadvantages. Among the most commonly used battery chemistries are: nickel cadmium (NiCad), nickel-metal hydride (NiMH), lithium ion (Li-ion) and lithium-polymer (Li-polymer).

NiCad batteries have nickel and cadmium electrodes and a potassium hydroxide electrolyte. NiCad batteries are the most common rechargeable batteries, however, NiCad batteries are subject to a number of problems. For example, NiCad batteries have a memory effect, which is a loss of battery capacity caused by recharging the battery before it is fully discharged. Additionally, NiCad batteries are susceptible to over-charging, which causes the battery to develop internal short circuits, thereby causing the battery to run down prematurely which may eventually cause the battery to take no charge at all. Additionally, cadmium is a poisonous heavy metal, and so disposing of NiCad batteries presents additional problems.

NiMH batteries offer higher energy density than NiCad batteries, eliminate many of the disposal problems, and are relatively inexpensive. NiMH batteries have a hydrogen-absorbing alloy anode, a nickel compound cathode, and a potassium hydroxide electrolyte. However, NiMH batteries also have a number of disadvantages. For example, NiMH batteries have a high self-discharge rate, are subject to voltage depression (an effect similar to the memory effect seen in NiCad batteries), and are sensitive to thermal conditions.

In recent years, Li-ion batteries have become the rechargeable battery of choice in devices such as portable computers. The chemistry behind Li-ion batteries involves lithium-plated foil anodes, an organic electrolyte, and lithium compounds within carbon electrodes. Li-ion batteries have very high energy densities, better cycle life than NiMH or NiCad batteries, higher output voltages, and lower self-discharge rates. However, one problem with Li-ion batteries, and potentially other battery chemistries, is the batteries' vulnerability to damage when charged to high capacity (e.g. 85–100% of full capacity) and exposed to high temperatures (e.g. 55° C. and higher).

The complexity of these rechargeable battery chemistries and the complexity of the devices in which such batteries are used requires that rechargeable battery packs be managed by control electronics. Control electronics can be used to monitor and regulate battery pack activity, as well as to interact with other devices such as portable computers or battery chargers. Control electronics include, for example, temperature monitoring circuits, voltage monitoring circuits, current monitoring circuits, controllers, charging circuits, and protection circuits.

Control electronics are particularly important for so-called smart batteries. Smart batteries are rechargeable battery packs equipped with control electronics to provide present capacity information and charging information about the battery to a host device. The control electronics can be embedded in the battery pack, or exist outside the battery pack. Wherever the control electronics are located, the control electronics also monitor the environmental conditions of the battery pack. Smart batteries often maintain information regarding environment, charging characteristics, discharge characteristics, self-discharge characteristics, capacity information, and/or other performance characteristics. Such information can be stored in the battery pack or separate from the battery pack. Smart batteries may also include programmable alarm values for events such as remaining run-time, over-charge, or over-temperature. Based on the battery characteristics, environmental conditions, and measured battery properties (e.g. current and voltage), the control electronics allow the smart battery to accurately determine remaining battery life, power availability and optimal charging conditions. Moreover, this information can be provided to a host device or a smart battery charger.

Rechargeable battery packs often include devices to protect the rechargeable batteries themselves, the battery pack as a whole, or the host device that uses power from the battery pack. For example, many rechargeable battery packs include an internal switch, activated by a controller, to regulate current flow based on the state of the battery pack, for example whether it is in use or not. Fuses are also used to prevent excessive current flow into or out of the battery pack, or to otherwise disable the battery for a host device's protection. For example, if the internal switch of the battery pack has failed, a fuse can be opened by the battery pack's controller so as to prevent unanticipated or uncontrollable current discharge.

Control electronics for rechargeable battery packs often include a controller, typically an integrated circuit microcontroller, or microprocessor. Proper function of the control electronics depends in part on the controller behaving as designed. Consequently, one failure mode for a controller is when the controller is operated under conditions outside of those specified by the controller's manufacturer. An example of such a failure mode is operation of a controller at a temperature below the minimum operating temperature specified by the manufacturer.

One such controller is available from Mitsubishi Electric under the trade designation M37515. The M37515 is a microcontroller typical of those used in rechargeable battery packs. The manufacturer's specification indicates that the minimum operating temperature for the M37515 is −20° C. (−4° F.). Although rechargeable battery packs are not normally used at or below such temperatures, it is not uncommon for battery packs to be exposed to low temperatures during shipping or while in storage. Exposure of the rechargeable battery pack to low temperatures increases the likelihood that the controller will malfunction or fail, which in turn threatens the battery pack. For example, when a controller malfunctions, it may loose the ability to accurately measure current going into or out of the battery pack. If the battery pack is already in a state where its internal switch is turned off, and the controller is erroneously measuring a current flow because the controller is malfunctioning, the controller might conclude that the internal switch has failed. The controller would then cause a protective fuse to be opened because of the perceived problem with the switch. Once the fuse is opened, the battery pack may require service or may be completely unusable. Regardless, the controller's mismeasurement (caused by failure due to low temperature) can lead to unnecessary damage to the rechargeable battery pack.

Accordingly, it is desirable to have a rechargeable battery pack that will protect itself from certain failure modes by preventing its controller from operating at temperatures below a specified level.

SUMMARY OF THE INVENTION

It has been discovered that a rechargeable battery pack that includes a controller, a temperature monitoring circuit, a rechargeable battery, and a heating circuit, advantageously provides a battery pack that senses when the battery pack is exposed to a harmful low temperature and causes the heating circuit to heat the battery pack, particularly the battery pack's controller, so that the controller remains in a temperature regime compatible with normal operation.

Accordingly, one aspect of the present invention provides a rechargeable battery pack that includes a rechargeable battery having a positive terminal and a negative terminal, a heater circuit coupled to the rechargeable battery, a controller coupled to the heater circuit, and a temperature monitoring circuit coupled to the controller. The temperature monitoring circuit is capable of measuring a temperature of the battery pack and providing a temperature indication to the controller. The controller causes the heater circuit to heat the controller based upon the indication.

In another aspect of the invention, a battery powered computer system includes a host device and a rechargeable battery pack coupled to the host device and capable of providing power to the host device. The rechargeable battery pack that includes a rechargeable battery having a positive terminal and a negative terminal, a heater circuit coupled to the rechargeable battery, a controller coupled to the heater circuit, and a temperature monitoring circuit coupled to the controller. The temperature monitoring circuit is capable of measuring a temperature of the battery pack and providing a temperature indication to the controller. The controller causes the heater circuit to heat the controller based upon the indication.

In still another aspect of the invention, a method of protecting a rechargeable battery is disclosed. A rechargeable battery pack is provided, including a rechargeable battery, a temperature monitoring circuit, a heater circuit, and a controller. A temperature of the rechargeable battery is measured with the temperature monitoring circuit. The measured temperature is compared with a threshold temperature to obtain a comparison result. Based upon the comparison result, the heater circuit is activated.

In yet another aspect of the present invention, an apparatus for protecting a rechargeable battery pack includes a heater circuit, a controller coupled to the heater circuit, and a temperature monitoring circuit coupled to the controller. The temperature monitoring circuit is capable of measuring a temperature of the battery pack and providing a temperature indication. The controller causes the heater circuit to heat the controller based upon the indication.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
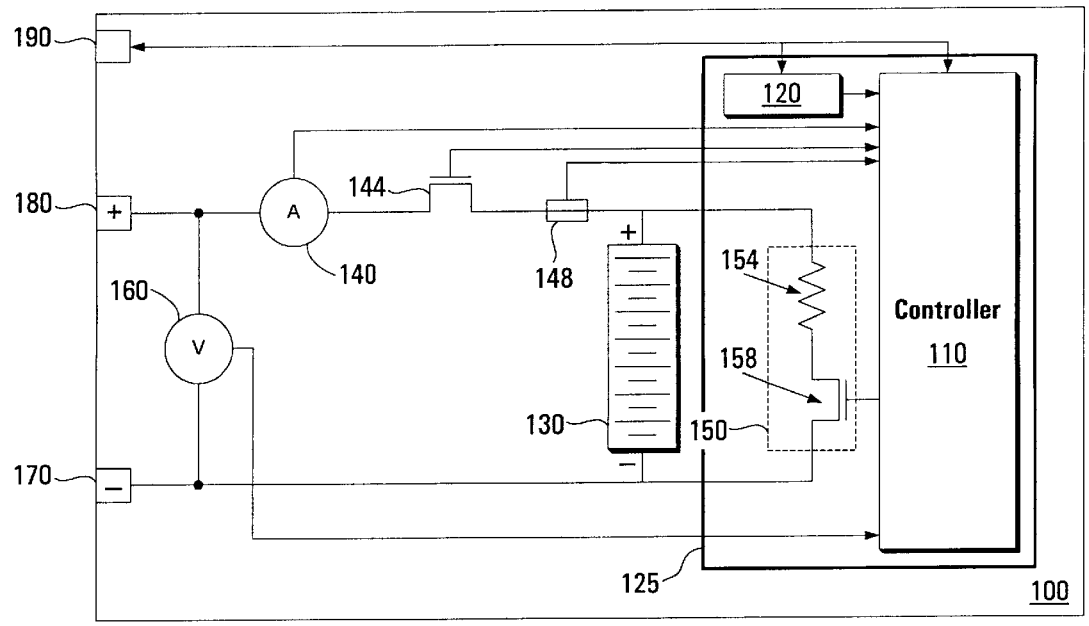
FIG. 1 is a functional block diagram showing a rechargeable battery pack.

Referring to FIG. 1, rechargeable battery pack 100 includes a controller 110, a temperature monitoring circuit 120, a rechargeable battery 130, current measuring circuit 140, heater circuit 150, and voltage measuring circuit 160. Battery 130 has a positive terminal and a negative terminal, and each is coupled to its respective battery pack terminals 180 and 170. Internal switch 144 is coupled to controller 110, thereby allowing the controller to control current flow from battery 130 by turning switch 144 on or off. Fuse 148 is also coupled to controller 110 and can be opened by the controller in order to prevent current flow in the event that internal switch 144 malfunctions or fails. Bus interface 190 is coupled to controller 110 and temperature monitoring circuit 120, allowing communication among those devices and devices external to the battery pack, such as a portable computer (e.g. computer system 210 of FIG. 2). Current is supplied to a load, such as a portable computer, through battery pack terminals 170 and 180. Current measuring circuit 140 and voltage measuring circuit 160 are each of conventional design. Circuits 140 and 160 provide signals (analog or digital) to controller 110 indicative of the instantaneous current and voltage, respectively, supplied or suppliable by the battery to the load.

Temperature monitoring circuit 120 is coupled to controller 110, and measures a temperature of the battery pack which, depending on the location of circuit 120 and the thermal properties of the battery pack, may be the temperature of a specific component like controller 110. In one embodiment, temperature monitoring circuit 120 includes a temperature sensor, a comparator, and a bus interface. One example of such a temperature monitoring circuit is available form National Semiconductor Corporation under the trade designation LM75. The temperature sensor, for example a silicon bandgap device, measures the temperature of the battery pack and provides temperature information to both the comparator and the bus interface. The comparator compares the measured temperature to a threshold temperature stored in a memory. Depending upon the result of the comparison, the comparator may alert another device to take further action. For example, if the threshold temperature is −18° C. and the temperature sensor detects that the battery temperature is −19° C., then the comparator provides a beyond-threshold indication to controller 110. Temperature monitoring circuit 120 may also monitor the rate at which the temperature of the battery pack is changing by comparing successive temperature measurements and provide an appropriate indication to the controller. Similarly, controller 110 can perform the monitoring of successive temperature measurements from circuit 120. Based on the indication or indications received from temperature monitoring circuit 120, which can include temperature warning signals and temperature value signals, controller 110 can then take action to protect the battery.

Alternatively, temperature monitoring circuit 120 may be a thermistor whose resistance depends on its temperature. A voltage measurement across the thermistor using a known current can provide controller 110 with a signal indicative of the battery pack temperature. Accordingly, temperature monitoring circuit 110 need not be coupled to bus interface 190. Those of ordinary skill in the art will recognize that a variety of different temperature monitoring circuits can be used in the present invention. FIG. 1 shows temperature monitoring circuit 120 located in close proximity to controller 110. Although such location is advantageous for more accurately monitoring the controller's temperature, such location is not necessary. For example, if temperature monitoring circuit 120 has sufficient thermal contact with the controller (e.g. via thermal epoxy between the two), proximity to the battery is not required.

Heater circuit 150 is shown coupled in parallel with battery 130, and is also coupled to controller 110 for activation. When activated, heater circuit 150 discharges electricity stored in the battery to provide heat for components of the battery pack. Heater circuit 150 need not be coupled in parallel with battery 130, and may, for example, be coupled in series with battery 130 if appropriate switching is coupled in Heater circuit 150 includes resistor 154 and transistor 158, coupled in series. When the controller determines that heating is required, the controller signals heating circuit 150. In this case, controller 110 is coupled to the gate of transistor 158 and the signal to heat the battery pack is a voltage applied to the gate of transistor 158, turning on the transistor and allowing current to be dissipated by resistor 154, thereby generating heat. Heating circuit 150 may be constructed from a variety of different components to achieve battery pack heating. For example, heater circuit 150 may consist solely of a field effect transistor (FET) that possess a variety of different resistances depending upon the voltage applied to the transistor's gate. Such a FET would serve as both a switch and a heating element. As another example, resistor 154 or the entire heater circuit 150 can be replaced with a specialized heating element designed for warming electronic components.

To enhance heater circuit 150's ability to deliver heat to a particular component, e.g. controller 110, thermally conductive medium 125 is included in battery pack 100. Thermally conductive medium 150 can be a thermally conductive, electrically insulative epoxy that is in thermal contact with both heater circuit 150 and controller 110. Such a medium can be in partial thermal contact with the heater circuit and components, or may entirely encase necessary portions of the battery pack elements. Additionally, a thermally insulative medium (not shown) can be used insulate all or part of the battery pack, thereby enhancing the battery pack's ability to retain the heat generated by heater circuit 150.

In addition to activating heater circuit 150 when necessary, controller 110 monitors the battery charge level based upon voltage and current measurements from circuits 160 and 140, and may perform other tasks such as determining the mode in which the battery pack currently operates. For example, a battery pack that is disconnected from a battery powered system, connected to a battery powered system that is turned off, or connected to a battery powered system that is receiving power from another source (e.g. AC power from a wall outlet) may be operating in a sleep mode where the control electronics consume little or no power. Under these conditions, the battery pack may remain in sleep mode until its current draw increases (e.g. it is used by a device), it sees some activity elsewhere in the system (e.g. communication through bus interface 190), it is awakened by temperature monitoring circuit 120, or some other condition. Alternatively, a battery pack that is in use may be in a wake mode where the control electronics are in use or powered for use. Consequently, the controller may be required to activate the heater circuit when the battery pack is in a variety of different modes.

Controller 110 may be a microcontroller, an application specific integrated circuit (ASIC), a microprocessor, and embedded processor, or any suitable control device. Indeed, controller 110 may include some or all of the voltage measuring, current measuring, temperature monitoring, and heater circuits.

Although only one battery 130 is shown, battery pack 100 may also contain a plurality of batteries in series, in parallel, or in some combination of the two. Moreover, the battery or batteries may be constructed based on NiCad, NiMH, Li-ion, Li-polymer, or any other suitable battery chemistry.

Figure 2:
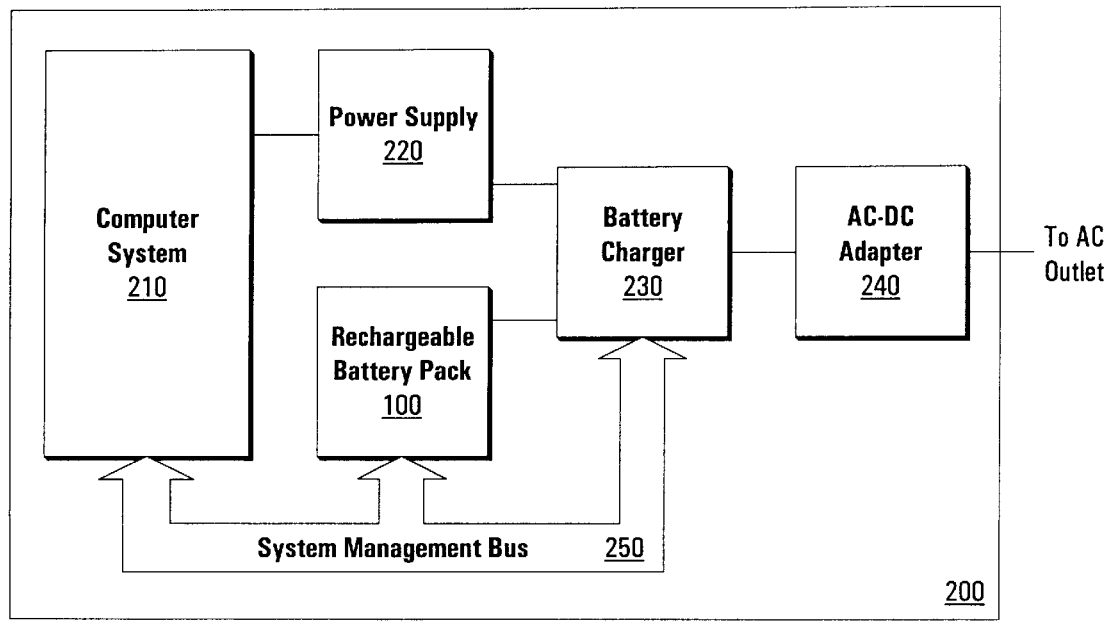
FIG. 2 illustrates a battery powered system including a rechargeable battery pack.

FIG. 2 illustrates a battery powered system 200 (in this case a portable computer system) that includes computer system 210, power supply 220, rechargeable battery pack 100, battery charger 230, and AC-DC adapter 240. Computer system 210, rechargeable battery pack 100, and battery charger 230 can communicate among each other over system management bus 250. Computer system 210 includes a processor and memory, as well as other devices necessary for computer system function, such a display screen, a disk drive, or a keyboard. Computer system 210 receives power from power supply 220 which in turn receives power from either rechargeable battery pack 100 or an electrical outlet (not shown) via AC-DC adapter 240. Battery charger 230 may charge rechargeable battery pack 100 if necessary.

Rechargeable battery pack 100 and battery charger 230 are examples of so-called "smart devices" because they can exchange information between themselves or among other devices via the system management bus 250. Such information exchange enhances interoperability among devices. Rechargeable batter pack 100 can provide computer system 210 and battery charger 230 with charging and present charge capacity information. In turn, computer system 210 can report to the user information including remaining battery capacity, remaining operating time, and availability of power for additional, specified loads. The system management bus also allows computer system 210 to monitor and provide optimal charging of battery pack 100. Additionally, the system management bus may be used to control the power consumption or operating state of various devices.

Figure 3:
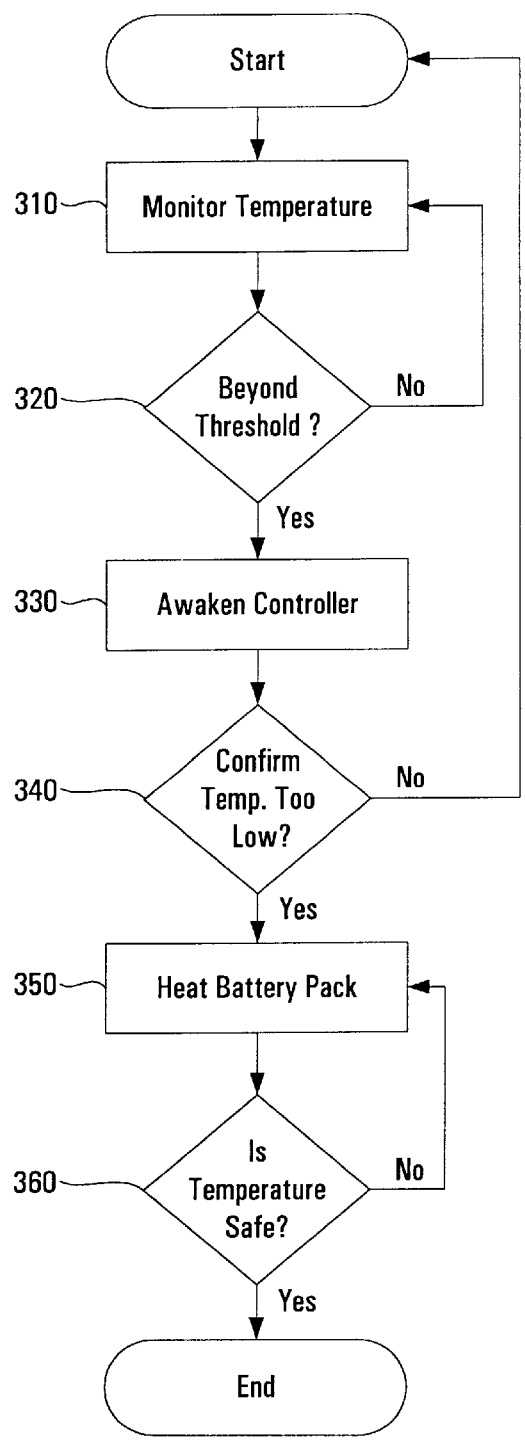
FIG. 3 is a flowchart illustrating a method for protecting a rechargeable battery.

FIG. 3 is a flow chart of a method of protecting a rechargeable battery pack. In monitor temperature step 310, the temperature of a rechargeable battery pack and/or a particular component (e.g. the controller) of the battery pack is determined and control transfers to threshold step 320. Monitoring may be accomplished by a temperature monitoring circuit, a temperature monitoring circuit acting in conjunction with a controller, or some other suitable device. In threshold step 320, the temperature of the battery pack is compared with a threshold temperature to determine if the battery pack temperature is beyond the threshold temperature. If the battery pack temperature is not beyond the threshold temperature, then control returns to monitor step 310. If the battery pack temperature is beyond the threshold temperature (e.g. the battery pack temperature is below a certain temperature) some appropriate action should be taken to protect the battery, and control transfers to awaken controller step 330. In awaken controller step 330, a controller is notified to wake up from its sleep mode. The controller may take a number of different actions. For example, the controller may confirm the battery pack temperature or the temperature of a particular component of the battery pack by polling the temperature monitoring circuit (as illustrated in confirm temperature step 340), it may automatically heat the battery pack, or the controller may determine if the battery charge level is such that exposure of the battery pack to the measured temperature threatens the performance of the battery pack. If the battery pack temperature is not too low, then the protection process restarts or resumes. If the battery pack temperature is too low, control is transferred to heat battery pack step 350, and the battery pack (or some component thereof) is heated. Heating may occur for a predetermined time, until the battery is completely discharged, or until the battery pack or component temperature is at a safe level. When heat battery pack step 350 is complete, control is transferred to temperature safe step 360. Temperature safe step 360 determines if the appropriate temperature is safe, and if not allows for additional heating by transferring control back to heat battery pack step 350. If the battery pack temperature is safe at a safe level, then the process terminates.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A rechargeable battery pack comprising:
    a rechargeable battery having a positive terminal and a negative terminal;
    a heater circuit, the heater circuit coupled to the rechargeable battery and operable to receive current from the rechargeable battery;
    a controller coupled to the heater circuit; and
    a temperature monitoring circuit coupled to the controller, the temperature monitoring circuit being capable of measuring a temperature of the battery pack and providing a temperature indication to the controller, the controller causing the heater circuit to heat the controller based upon the indication.

2. The battery pack of claim 1 further comprising a thermally conductive medium in thermal contact with the controller and the heater circuit.

3. The battery pack of claim 1 wherein the heater circuit is coupled in parallel with the rechargeable battery.

4. The battery pack of claim 1 wherein the heater circuit includes a heating element and a transistor coupled in series, the transistor being controlled by the controller.

5. The battery pack of claim 4 wherein the heating element includes a resistor.

6. The battery pack of claim 1 wherein the heater circuit includes a variable resistance field effect transistor.

7. The battery pack of claim 1 further comprising:
    a voltage measuring circuit coupled to the battery, the voltage measuring circuit capable of measuring a voltage across the battery and supplying a voltage indication to the controller; and
    a current measuring circuit coupled to the battery, the current measuring circuit capable of measuring the current from the battery and supplying a current indication to the controller.

8. The battery pack of claim 1 further comprising a fuse coupled to the rechargeable battery, the fuse further coupled to the controller and capable of being opened thereby.

9. The battery pack of claim 1 wherein the temperature monitoring circuit further comprises:
    a temperature sensor, the temperature sensor producing an analog temperature signal;
    an analog-to-digital converter coupled to the temperature sensor, the converter converting the analog temperature signal to a digital temperature value;
    a memory device;
    a comparator coupled to the converter and the memory device, the comparator including an output terminal, the comparator providing an output signal on the output terminal based on a comparison of the digital temperature value to a threshold temperature value stored in the memory device; and
    an interface coupled to the converter and the memory device, the interface allowing communication between the temperature monitoring circuit and the controller.

10. The battery pack of claim 9 wherein the temperature sensor is a silicon bandgap temperature sensor.

11. The battery pack of claim 1 further comprising a bus interface coupled to the controller.

12. The battery pack of claim 11 wherein the bus interface is a system management bus interface.

13. The battery pack of claim 1 wherein the rechargeable battery uses a battery chemistry selected from nickel cadmium, nickel-metal hydride, lithium ion, and lithium-polymer chemistries.

14. The battery pack of claim 1 wherein the controller is an integrated circuit selected from the group consisting of microcontrollers, microprocessors, application specific integrated circuits (ASICs), and embedded processors.

15. The battery pack of claim 1 wherein the temperature monitoring circuit is capable of providing a plurality of temperature indications, including a temperature warning signal and a temperature value signal.

16. A battery powered computer system comprising:
    a host device; and
    a rechargeable battery pack coupled to the host device, the battery pack capable of providing power to the host device, the battery pack including:
        a rechargeable battery having a positive terminal and a negative terminal;
        a heater circuit, the heater circuit coupled to the rechargeable battery and operable to receive current from the rechargeable battery;
        a controller coupled to the heater circuit; and
        a temperature monitoring circuit coupled to the controller, the temperature monitoring circuit being capable of measuring a temperature of the battery pack and providing a temperature indication to the controller, the controller causing the heater circuit to heat the controller based upon the indication.

17. The battery powered computer system of claim 16 wherein the host device includes a processor and a memory coupled to the processor, and wherein the processor and the memory are powered by the rechargeable battery pack.

18. The battery powered computer system of claim 16 further comprising a communications bus, the host device being coupled to the communications bus, the battery pack including a bus interface coupled to the controller and to the communications bus.

19. The battery powered computer system of claim 18 wherein the communications bus is a system management bus.

20. The battery powered computer system of claim 16 wherein the battery pack further comprises a thermally conductive medium in thermal contact with the controller and the heater circuit.

21. The battery powered computer system of claim 16 wherein the heater circuit is coupled in parallel with the rechargeable battery.

22. The battery powered computer system of claim 16 wherein the battery pack further comprises:
   a voltage measuring circuit coupled to the battery, the voltage measuring circuit capable of measuring a voltage across the battery and supplying a voltage indication to the controller; and
   a current measuring circuit coupled to the battery, the current measuring circuit capable of measuring the current from the battery and supplying a current indication to the controller.

23. The battery powered computer system of claim 16 wherein the battery pack further comprises a fuse coupled to the rechargeable battery, the fuse further coupled to the controller and capable of being opened thereby.

24. A method of protecting a rechargeable battery pack comprising:
   providing a rechargeable battery pack including a rechargeable battery, a temperature monitoring circuit, a heater circuit operable to receive current from the rechargeable battery, and a controller;
   measuring a temperature of the rechargeable battery with the temperature monitoring circuit;
   comparing the measured temperature with a threshold temperature to obtain a comparison result; and
   activating the heater circuit based upon the comparison result.

25. The method of claim 24 wherein the comparing step is performed by the temperature monitoring circuit.

26. The method of claim 24 wherein the comparing step is performed by the controller.

27. An apparatus for protecting a rechargeable battery pack comprising:
   a heater circuit operable to receive current from the rechargeable battery pack;
   a controller coupled to the heater circuit; and
   a temperature monitoring circuit coupled to the controller, the temperature monitoring circuit being capable of measuring a temperature of the battery pack and providing a temperature indication, the controller causing the heater circuit to heat the controller based upon the indication.

28. The apparatus of claim 27 further comprising a thermally conductive medium in thermal contact with the controller and the heater circuit.

29. The apparatus of claim 27 further comprising a fuse capable of being coupled to a rechargeable battery, the fuse further coupled to the controller and capable of being opened thereby.

30. The apparatus of claim 27 further comprising a bus interface coupled to the controller.

* * * * *